(12) United States Patent
Matalon

(10) Patent No.: US 9,046,180 B2
(45) Date of Patent: Jun. 2, 2015

(54) DIAPHRAGM AND BACKING CUSHION SHAPING FOR INCREASED MEMBRANE LIFE

(75) Inventor: Louis E. Matalon, Lancaster, PA (US)

(73) Assignee: ITT MANUFACTURING ENTERPRISES LLC.

( * ) Notice: Subject to any disclaimer, the term of this patent is extended or adjusted under 35 U.S.C. 154(b) by 4 days.

(21) Appl. No.: 13/599,237

(22) Filed: Aug. 30, 2012

(65) Prior Publication Data

US 2014/0061525 A1 Mar. 6, 2014

(51) Int. Cl.

| F16K 1/00 | (2006.01) |
|---|---|
| F16K 7/00 | (2006.01) |
| F16K 15/00 | (2006.01) |
| F16K 7/12 | (2006.01) |
| F16K 7/16 | (2006.01) |

(52) U.S. Cl.
CPC .. *F16K 7/126* (2013.01); *F16K 7/16* (2013.01)

(58) Field of Classification Search
CPC .............. F16K 7/126; F16K 7/12; F16K 7/16
USPC ................................ 251/331, 367; 92/89, 96
See application file for complete search history.

(56) References Cited

U.S. PATENT DOCUMENTS

| 2,397,373 | A | | 3/1946 | Saunders |
| 2,684,829 | A | | 7/1954 | McFarland, Jr. |
| 2,916,255 | A | | 12/1959 | Koehler |
| 3,011,758 | A | | 12/1961 | McFarland, Jr. |
| 3,091,427 | A | * | 5/1963 | Boteler ........................... 251/77 |
| 3,130,954 | A | | 4/1964 | McFarland, Jr. |
| 3,134,571 | A | | 5/1964 | Boteler |
| 3,426,999 | A | | 2/1969 | Toinet |
| 3,631,882 | A | | 1/1972 | White, Jr. |
| 3,792,720 | A | | 2/1974 | Robbins |
| 4,147,824 | A | | 4/1979 | Dettmann et al. |
| 4,214,604 | A | | 7/1980 | Rumsey |

(Continued)

FOREIGN PATENT DOCUMENTS

| CH | 285887 | 1/1953 |
| DE | 10216661 | 10/2003 |

(Continued)

OTHER PUBLICATIONS

DE10216661 (1 page) English Language Abstract.

(Continued)

*Primary Examiner* — Craig Schneider
*Assistant Examiner* — Kevin Barss

(57) ABSTRACT

A weir-type diaphragm valve includes a valve body with a fluid channel and a weir with a weir sealing portion; and a diaphragm with diaphragm portions, including a diaphragm weir sealing portion at the weir that responds to one force and travel against the weir sealing portion to close the valve and stop fluid flow through the fluid channel, and responds to a second force and travel away from the weir sealing portion to open the valve and allow fluid through the fluid channel, a center flexing portion off the weir that experiences convex and concave flexing extremes when the valve is closed/opened, and an outer sealing portion fully constrained between components, one of which includes the valve body, when the valve is closed/opened. The diaphragm portions have different characteristics based on different material stresses associated with different functionality that each portion performs when the valve is closed/opened.

21 Claims, 5 Drawing Sheets

Diaphragm Selective Thickening
(Quarter Section View of Laminated Diaphragm)

(56) References Cited

U.S. PATENT DOCUMENTS

| | | |
|---|---|---|
| 4,327,891 A | 5/1982 | Allen et al. |
| 4,353,243 A | 10/1982 | Martin |
| 4,785,719 A | 11/1988 | Bachschmid et al. |
| 4,869,282 A | 9/1989 | Sittler et al. |
| 4,887,516 A | 12/1989 | Scott et al. |
| 4,913,397 A | 4/1990 | Bronnert |
| 4,933,529 A | 6/1990 | Saville |
| 5,063,958 A | 11/1991 | Wisneskie et al. |
| 5,104,090 A | 4/1992 | Grizzle et al. |
| 5,107,887 A | 4/1992 | White et al. |
| 5,271,601 A | 12/1993 | Bonzer et al. |
| 5,437,219 A | 8/1995 | Scott et al. |
| 5,490,659 A | 2/1996 | Whiteside |
| 5,632,465 A | 5/1997 | Cordua |
| 5,836,571 A | 11/1998 | Streitman et al. |
| 5,894,784 A | 4/1999 | Bobbitt, III et al. |
| 5,941,505 A | 8/1999 | Nagel |
| 5,964,446 A | 10/1999 | Walton et al. |
| 5,996,470 A | 12/1999 | Eady et al. |
| 6,079,441 A | 6/2000 | Miller et al. |
| 6,102,071 A | 8/2000 | Walton et al. |
| 6,142,062 A | 11/2000 | Streitman |
| 6,145,430 A | 11/2000 | Able et al. |
| 6,158,327 A | 12/2000 | Huss |
| 6,241,213 B1 | 6/2001 | Butler |
| 6,491,283 B2 | 12/2002 | Newberg |
| D470,226 S | 2/2003 | Herbert |
| 6,575,431 B2 * | 6/2003 | Artsvelyan ............ 251/331 |
| 6,685,164 B1 | 2/2004 | Koizumi et al. |
| 6,746,637 B1 | 6/2004 | Huss et al. |
| 6,786,470 B2 | 9/2004 | Newberg |
| 6,926,251 B2 | 8/2005 | Gill |
| 6,971,634 B2 | 12/2005 | Funari et al. |
| 7,108,240 B2 | 9/2006 | Funari et al. |
| 7,243,903 B2 | 7/2007 | Wincek |
| 7,255,324 B2 | 8/2007 | Schlude |
| 7,634,962 B2 | 12/2009 | Muller |
| 7,739,915 B2 | 6/2010 | Pantier et al. |
| 7,922,147 B2 | 4/2011 | O'Connor et al. |
| 7,926,785 B2 | 4/2011 | Wincek |
| 8,152,132 B2 | 4/2012 | McCarty et al. |
| 2002/0056826 A1 | 5/2002 | Tripoli |
| 2005/0205815 A1 | 9/2005 | Frenkel |
| 2011/0031427 A1 | 2/2011 | Sitnikov |
| 2012/0119130 A1 | 5/2012 | Reed et al. |

FOREIGN PATENT DOCUMENTS

| | | |
|---|---|---|
| EP | 0023409 | 2/1981 |
| EP | 0870957 | 10/1998 |
| FR | 2325869 | 4/1977 |
| GB | 2212598 | 7/1989 |
| WO | 9717558 | 5/1997 |

OTHER PUBLICATIONS

EP0870957 (1 page) English Language Abstract.
8 pages European Search Report EP application 13179975.1-1751.

* cited by examiner

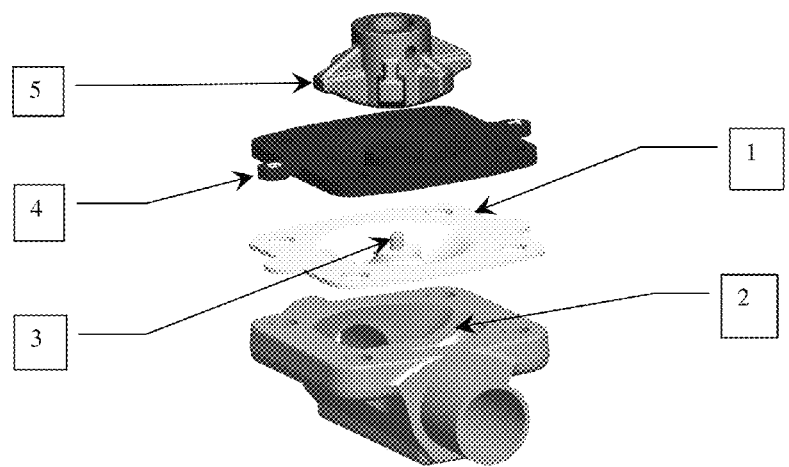
Figure 1a: Traditional PTFE Diaphragm Valve Sealing Components
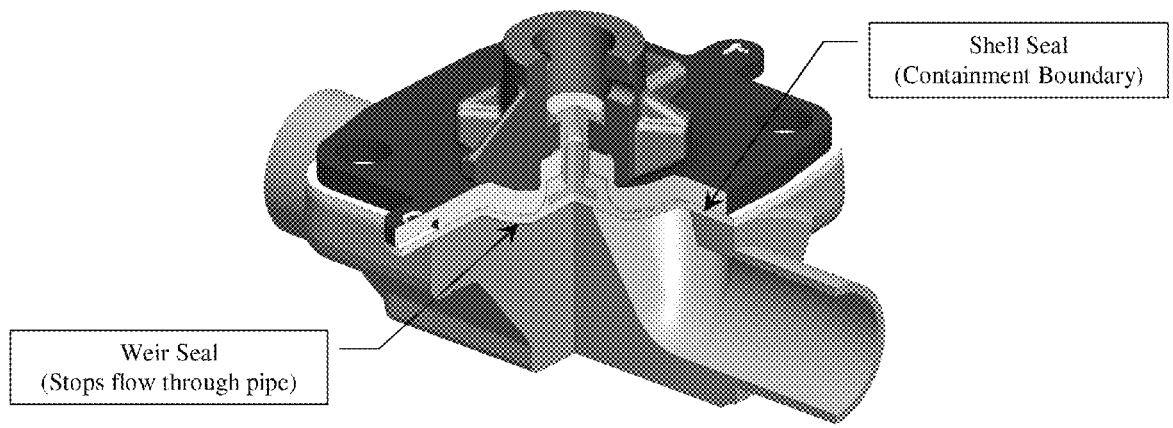
Figure 1b: Quarter Section of Traditional PTFE Diaphragm Valve Sealing Components

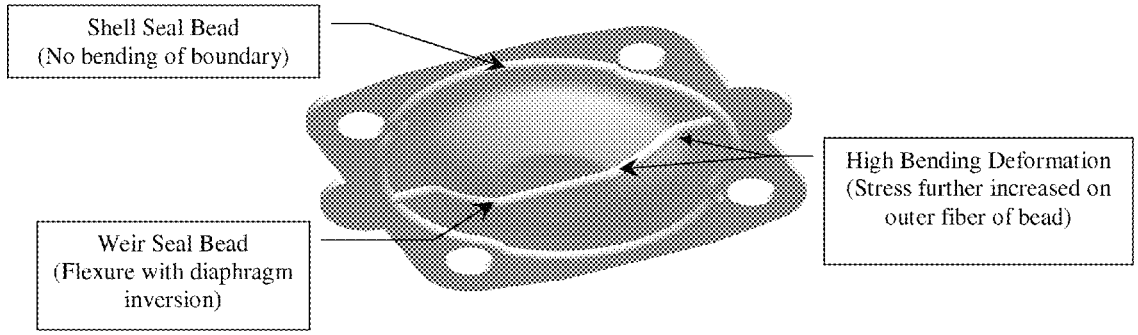
Figure 1c: Traditional PTFE Diaphragm
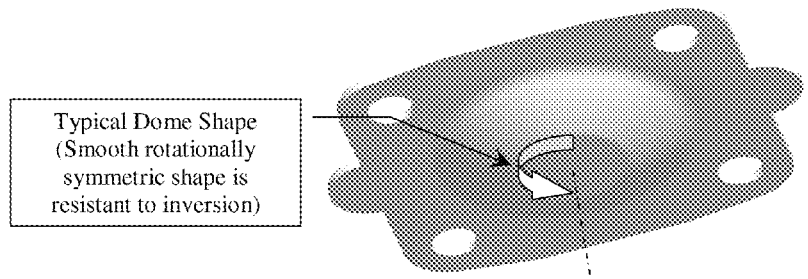
Figure 1d: Shown Without Bead to Highlight Traditional Diaphragm Shape

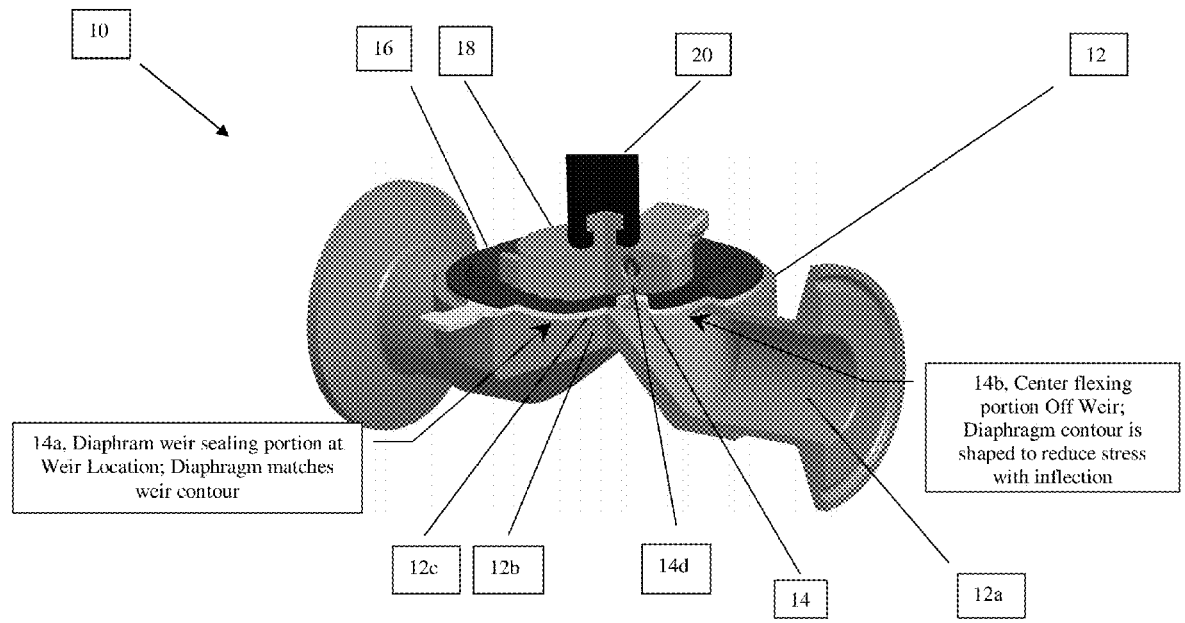
Figure 2a: Deviation from Rotational Symmetry
(Assembly containing Plastic Diaphragm with Backing Cushion)
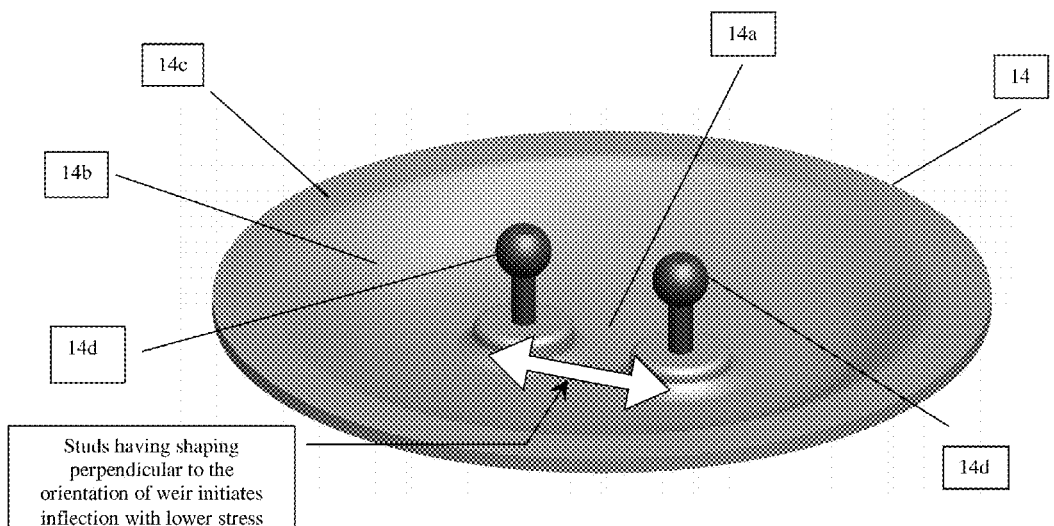
Figure 2b: Deviation from Rotational Symmetry
(Plastic Diaphragm)

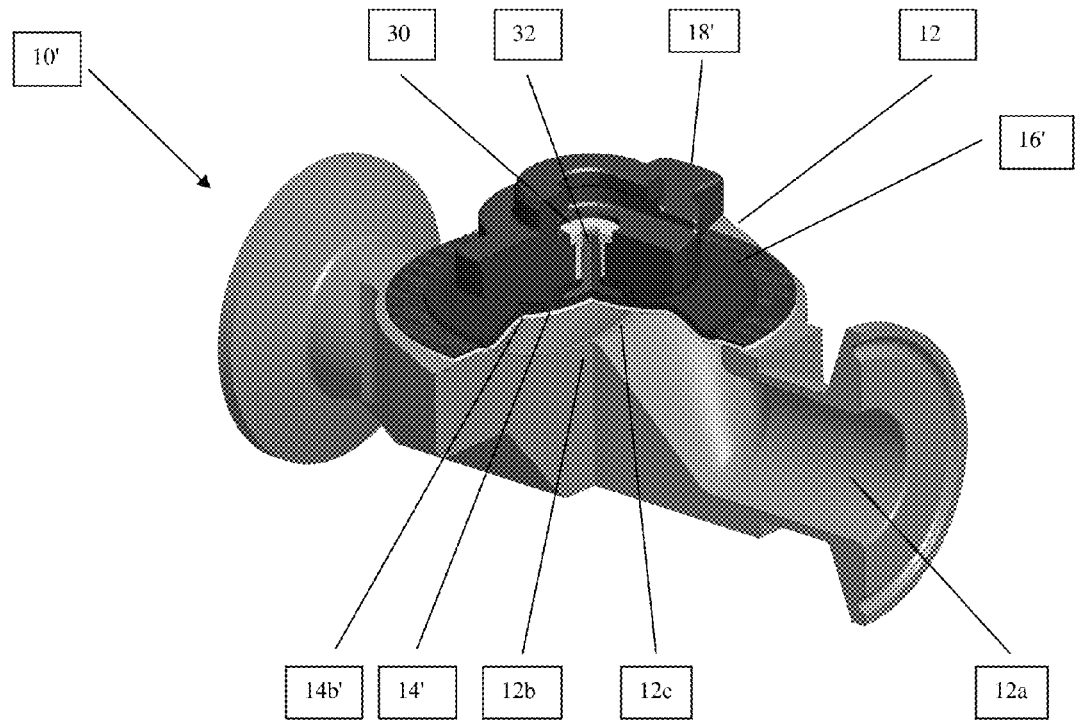
Figure 3a: Diaphragm "Free" Shape between the Open & Closed
(Assembly containing Laminated Diaphragm)
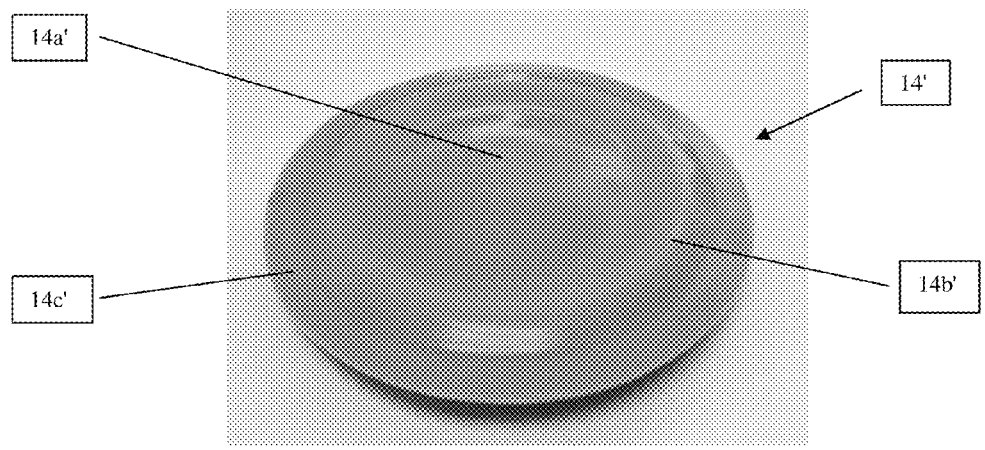
Figure 3b: Diaphragm "Free" Shape between the Open & Closed
Also shows Elimination of Seal Bead
(Photograph of Laminated Diaphragm)

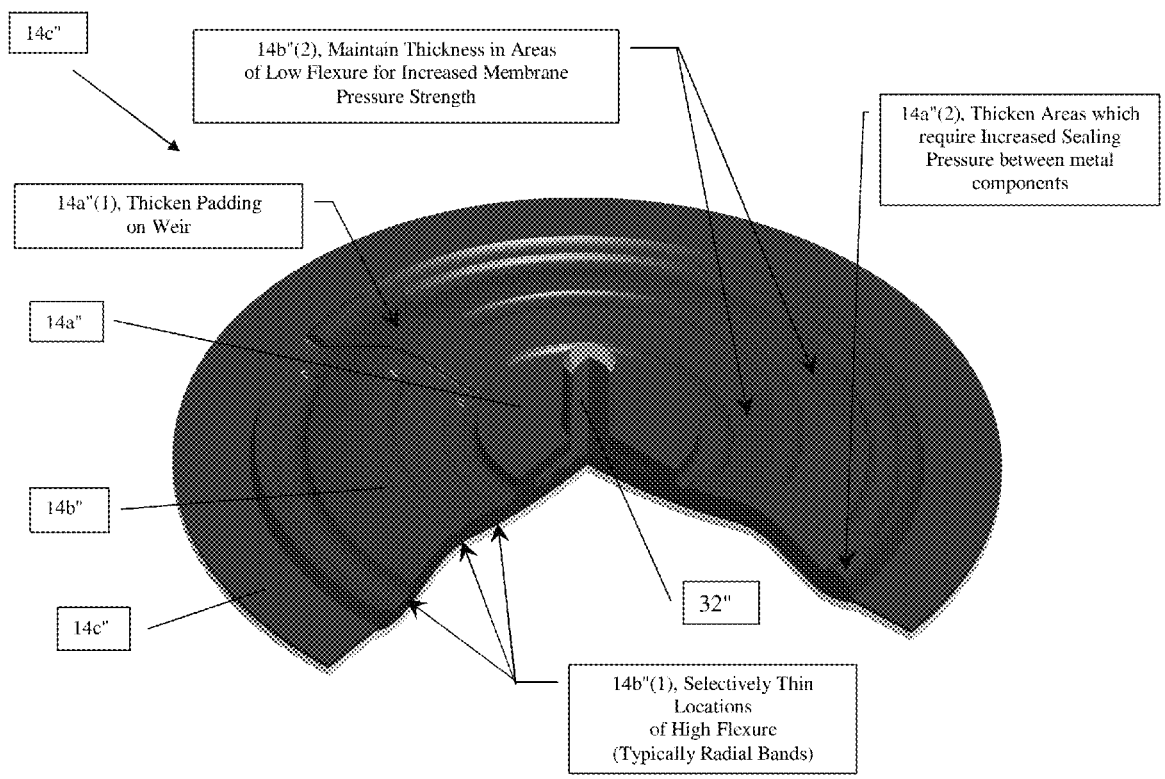
Figure 4: Diaphragm Selective Thickening
(Quarter Section View of Laminated Diaphragm)

DIAPHRAGM AND BACKING CUSHION SHAPING FOR INCREASED MEMBRANE LIFE

BACKGROUND OF THE INVENTION

1. Field of the Invention

The present invention relates to a diaphragm valve; and more particularly relates to a diaphragm valve having a weir.

2. Brief Description of Related Art

FIGS. 1a to 1d show different parts of a known weir-type diaphragm valve. In FIG. 1a, a diaphragm valve is sealed by a membrane, the diaphragm (1), which must repeatedly travel from a sealed position, against the body weir (2) to an open position. The diaphragm (1) is typically opened with a metal stud (3) embedded within the membrane. An outer seal of the diaphragm (1) is fully constrained while the center of the diaphragm (1) typically experiences the majority of travel to facilitate the open and closed positions. The shape cycles between convex and concave extremes for closed and open positions respectively. As a result, locations of greatest deformation, from bending magnitude and geometry such as thickness, result in the highest material stress. Although the membrane material is chosen to be compliant to these mechanical cycles, it has limitations, especially when combined with certain process requirements, such as extreme cold, heat and/or steam conditions. These conditions weaken the material such that areas of high mechanical stress can limit the life expectancy of the diaphragm. In FIG. 1a, the weir-type diaphragm valve has a backing cushion (4) that acts as a compliant spring membrane between a metal compressor (5) and the plastic diaphragm (1), typically made from Teflon.

SUMMARY OF THE INVENTION

In summary, the present invention consists of four design feature solutions to reduce the stress associated with the functioning of a diaphragm in a weir-type diaphragm valve. They can be used individually, or in tandem, and are summarized as follows:

1) Deviation from rotational symmetry:
   a) Match the weir shape when in the closed position only on the weir, and
   b) Shape membrane on either side of weir to reduce resistance to diaphragm inversion.
2) Form a diaphragm "free" shape between open and closed requirements:
   a) Balances the tensile and compressive material stress extremes during mechanical cycling, and
   b) Facilitates easier diaphragm installation with a midway compressor position.
3) Vary the diaphragm thickness:
   a) Thin locations which require the greatest bending during mechanical cycling,
   b) Thicken areas which experience minimum bending, and
   c) Thin Elastomer material that is not located at sealing areas such as the weir.
4) Reduce weir bead height or eliminate weir bead in areas of greatest membrane inflection in order to eliminate tensile crack propagation in the sealing bead.
   a) Small cross section of bead cannot resist bending,
   b) Bead outer fiber forced into high compressive and tensile deformation, and
   c) Cracks develop perpendicular to the bead length, thereby defeating the seal.

Moreover, the diaphragm shaping methods according to the present invention can reduce the force required to open the diaphragm. The diaphragm is typically opened with a stud embedded within the membrane. Reduction of this opening force reduces the stress in the elastomer or plastic material encapsulating the stud, resulting in increased life expectancy for the diaphragm.

Moreover still, in many cases the aforementioned features may also be applied to the backing cushion as well, which acts as a compliant spring membrane between the metal compressor and the diaphragm. Selective thickening, thinning, and shaping of this component has similar benefits.

Specific Embodiments

According to some embodiments, the present invention may take the form of apparatus, including a weir-type diaphragm valve that features a valve body and a diaphragm. The valve body may be configured with a fluid channel and a weir having a weir sealing portion. The diaphragm may be configured with two or more diaphragm portions, including
   a diaphragm weir sealing portion at the weir to respond to one force and travel against the weir sealing portion to close the weir-type diaphragm valve and stop fluid flow through the fluid channel, and respond to a second force and travel away from the weir sealing portion to open the weir-type diaphragm valve and allow fluid flow through the fluid channel,
   a center flexing portion off the weir configured to experience convex and concave flexing extremes when the weir-type diaphragm valve is closed and opened, and
   an outer sealing portion configured to be fully constrained between components, one of which includes the valve body, when the weir-type diaphragm valve is closed and opened.

The two or more diaphragm portions are configured with different characteristics based at least partly on different material stresses associated with different functionality that each portion is configured to perform when the weir-type diaphragm valve is closed and opened.

The present invention may also include one or more of the following features:

Deviation from Rotational Symmetry

According to some embodiments of the present invention, the different characteristics may be based at least partly on the shape of the diaphragm weir sealing portion at the weir, including being based at least partly on a deviation from a rotational symmetry. By way of example, the shape of the diaphragm weir sealing portion at the weir matches the shape of the weir sealing portion. Moreover, the center flexing portion off the weir may also be shaped to reduce stress with inflection, e.g., including shaping the center flexing portion on either side of the weir to reduce resistance to diaphragm inversion. Moreover still, the diaphragm weir sealing portion may include a pair of studs embedded therein and configured perpendicular to the weir to initiate inflection with lower stress.

Form a Diaphragm "Free" Shape Between Open and Closed Requirements

According to some embodiments of the present invention, the different characteristics may be based at least partly on forming a diaphragm "free" shape between open and closed requirements of the weir-type diaphragm. By way of example, the diaphragm "free" shape may include, or take the form of, configuring the diaphragm by balancing tensile and compressive material stress extremes during mechanical cycling with the added benefit of facilitating easier diaphragm installation with a midway compressor position.

Vary the Diaphragm Thickness

According to some embodiments of the present invention, the different characteristics may be based at least partly on the thickness of the two or more diaphragm portions. For example, the diaphragm weir sealing portion at the weir may be configured with thickened padding to achieve the required function of geometrical compliance between the compressor and body; the center flexing portion off the weir may be configured with thin locations or elastomeric material which require the most bending or flexing during mechanical cycling; and/or the thin locations or elastomeric material may be configured at least partially around the center flexing portion. Moreover, the center flexing portion off the weir may be configured with thickened locations in areas of low flexure for increased membrane pressure strength; and/or the thickened locations may be configured at least partially around the center flexing portion. Moreover still, the center flexing portion off the weir is configured with: thin locations or elastomeric material which require the most bending or flexing during mechanical cycling, the thin locations or elastomeric material being configured at least partially around the center flexing portion; thickened locations in areas of low flexure for increased membrane pressure strength, the thickened locations are configured at least partially around the center flexing portion; and/or the thin locations or elastomeric material and the thickened locations may be configured so as to alternate. Furthermore, the outer sealing portion may be configured, thickened or thinned, to generate required sealing pressure across the weir, between metal components, when the weir-type diaphragm valve is closed.

Reduce Weir Bead Height or Elimination of Weir Bead in Areas of Greatest Membrane Inflection According to some embodiments of the present invention, the diaphragm may be configured without, or with a substantially reduced, weir bead height, particularly in areas of greatest membrane inflection.

Different Material Stresses

According to some embodiments of the present invention, the different characteristics may be based at least partly on different material stresses associate with deformations of the two or more diaphragm portions. For example, the diaphragm weir sealing portion may have a first physical characteristic based at least partly on one type of diaphragm surface stress at the weir related to the pushing and pulling of the weir sealing portion to and from the weir in order to close and open the weir-type diaphragm valve, and the center portion may have a second physical characteristic based at least partly on another type of diaphragm surface stress off the weir related to mechanical cycling of the center flexing portion when opening and closing the weir-type diaphragm valve.

The Backing Cushion

According to some embodiments of the present invention, the weir-type diaphragm valve may include a backing cushion as a compliant spring membrane between a metal compressor and the diaphragm, and the backing cushion may include two or more backing cushion portions configured with different characteristics based at least partly on different material stresses associated with different functionality that each portion is configured to perform when the weir-type diaphragm valve is closed and opened

Summary and Advantages

In summary, the present invention increases the life expectancy of the diaphragm by reducing the surface stress incurred during mechanical cycling, particularly during exposure to destructive process such as steam and cold. With some of the described features, a related reduction in the force required to open the diaphragm additionally benefits life of the diaphragm membrane surrounding the opening mechanism, typically an embedded metal stud.

BRIEF DESCRIPTION OF THE DRAWING

The drawing includes the following Figures, not necessarily drawn to scale:

FIG. 1a shows an exploded view of traditional PTFE diaphragm valve sealing components that are known in the art.

FIG. 1b shows a quarter section of the traditional PTFE diaphragm valve sealing components that are known in the art when assembled together.

FIG. 1c shows a traditional PTFE diaphragm having a bead that is known in the art when assembled together.

FIG. 1d shows a traditional PTFE diaphragm similar to that shown in FIG. 1c but without the bead.

FIG. 2a shows a diaphragm valve having a diaphragm with a deviation from rotational symmetry according to some embodiments of the present invention.

FIG. 2b shows the diaphragm in FIG. 2a according to some embodiments of the present invention.

FIG. 3a shows a quarter section of a diaphragm valve having a diaphragm with a diaphragm "free" shape according to some embodiments of the present invention.

FIG. 3b shows the diaphragm in FIG. 3a according to some embodiments of the present invention.

FIG. 4 shows a diaphragm having selective thickening according to some embodiments of the present invention.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

According to some embodiments, the present invention may take the form of apparatus, including a weir-type diaphragm valve generally indicated as 10, 10' (e.g., see FIGS. 2a, 3a), that features a valve body 12 and a diaphragm 14, 14'. The valve body 12 may be configured with a fluid channel 12a and a weir 12b having a weir sealing portion 12c. The diaphragm 14, 14' may be configured with two or more diaphragm portions or areas 14a, 14b, 14c (FIGS. 2a, 2b); 14a', 14b', 14c' (FIGS. 3a, 3b); 14a'', 14b'', 14c'' (FIG. 4), including
a diaphragm weir sealing portion 14a, 14a', 14a'' at the weir 12b to respond to one force and travel against the weir sealing portion 12c to close the weir-type diaphragm valve 10 and stop fluid flow through the fluid channel 12a, and respond to a second force and travel away from the weir sealing portion 12c to open the weir-type diaphragm valve 10 and allow fluid flow through the fluid channel 12a,
a center flexing portion 14b, 14b', 14b" off the weir 12b configured to experience convex and concave flexing extremes when the weir-type diaphragm valve 10 is closed and opened, and
an outer sealing portion 14c, 14c', 14c" configured to be fully constrained between components, one of which includes the valve body, when the weir-type diaphragm valve is closed and opened.

The two or more diaphragm portions 14a, 14b, 14c ; 14a', 14b', 14c'; 14a", 14b", 14c" may be configured with different characteristics based at least partly on different material stresses associated with different functionality that each portion 14a, 14b, 14c is configured to perform when the weir-type diaphragm valve 10, 10' is closed and opened.

The various embodiments for implementing the present invention may include one or more of the following:

FIGS. 2a, 2b: Deviation from Rotational Symmetry

FIGS. 2a, 2b show an embodiment of the weir-type diaphragm valve 10, in which the present invention is implemented based at least partly on a deviation from a rotational symmetry, according to some embodiments of the present invention.

For example, the different characteristics may be based at least partly on the shape of the diaphragm weir sealing portion 14a at the weir 12b. In particular, the shape of the diaphragm weir sealing portion 14a at the weir 12b may be configured to match the shape of the weir sealing portion 12c. Moreover, the center flexing portion off the weir may also be shaped to reduce stress with inflection, e.g., including shaping the center flexing portion on either side of the weir to reduce resistance to diaphragm inversion. Moreover still, the diaphragm weir sealing portion 14a may include a pair of studs 14d embedded therein and configured perpendicular to the orientation of the weir 12b to initiate inflection with lower stress. Each stud 14d is embedded in the diaphragm 14 so as to be arranged on a respective side of the weir 12b when the weir-type diaphragm valve is closed. Weir-type diaphragm valves having two such studs like element 14d are disclosed in patent application Ser. No. 13/554,535, filed 20 Jul. 2012, entitled "Two-stud Diaphragm for Diaphragm Valve," (911-002.049-1//F-EV-1201US), which is hereby incorporated by reference in its entirety.

In FIG. 2a, the weir-type diaphragm valve 10 also includes a backing cushion 16, a compressor 18 and a spindle 20, as shown.

The embodiments shown in FIGS. 2a and 2b are provided by way of example, and other embodiments or configurations having a deviation from rotational symmetry of the diaphragm 14 are envisioned that are consistent with the spirit of the present invention, but might otherwise appear visually different than that specifically shown in FIGS. 2a and 2b. For example, FIG. 2b shows the diaphragm weir sealing portion 14a having a pair of studs 14d embedded therein and configured perpendicular to the weir 12b to initiate inflection with lower stress. However, embodiments are envisioned having three studs with two studs on the high pressure side of the weir 12b and one stud on the low pressure side of the weir 12b; or with two studs on each side of the weir 12b. The scope of the invention is also not intended to be limited to any particular distance between the two studs 14d.

FIGS. 3a, 3b: Form a Diaphragm "Free" Shape Between Open and Closed Requirements FIGS. 3a, 3b show an embodiment for implementing the present invention based at least partly on forming a diaphragm "free" shape between open and closed requirement of the weir-type diaphragm valve, according to some embodiments of the present invention.

For example, the different characteristics may be based at least partly on forming a diaphragm "free" shape between open and closed requirements of the weir-type diaphragm valve 14'. By way of example, the diaphragm "free" shape may include, or take the form of, configuring the diaphragm 14' by balancing tensile and compressive material stress extremes during mechanical cycling, which also facilitates easier diaphragm installation with a midway compressor position. In FIG. 3b, the diaphragm weir sealing portion 14a is shown having a balloon-like shape or contour, while the center flexing portion 14U is shown having a curved portion extending completely around the diaphragm weir sealing portion 14a. The outer sealing portion 14c' is shown extending around the center flexing portion 14b'.

In FIG. 3a, the weir-type diaphragm valve 10' also includes a backing cushion 16', a compressor 18', a tube nut 30 and an attachment stud 32, as shown.

The embodiments shown in FIGS. 3a and 3b are provided by way of example, and other embodiments or configurations having a deviation from rotational symmetry of the diaphragm 14 are envisioned that are consistent with the spirit of the present invention, but might otherwise appear visually different than that specifically shown in FIGS. 3a and 3b. For example, the scope of the invention is not intended to be limited to the specific balloon-like shape or contour of the diaphragm weir sealing portion 14a shown in FIG. 3b. Embodiments are envisioned in which the diaphragm weir sealing portion 14a has a different shape than that shown in FIG. 3b that would still be within the spirit of the present invention. Further, the scope of the invention is not intended to be limited to the specific curved portion of the center flexing portion 14U. Embodiments are envisioned in which the center flexing portion 14b' has a different curvature or shape than that shown in FIG. 3b that would still be within the spirit of the present invention. The embodiments shown in FIGS. 3a and 3b include both the balloon-like shape or contour of the diaphragm weir sealing portion 14a in combination with the curved portion of the center flexing portion 14b'. However, embodiments are envisioned in which the diaphragm is implemented with only one of these features, but in combination with some other feature disclosed herein within the spirit of the present invention.

FIG. 4: Vary the Diaphragm Thickness

FIG. 4 shows embodiments for implementing the present invention based at least partly on varying the thickness of a diaphragm 14", according to some embodiments of the present invention.

For example, the different characteristics may be based at least partly on the thickness of the two or more diaphragm portions or areas 14a", 14b", 14c". In particular, the diaphragm weir sealing portion 14a" at the weir may be configured with a weir seal pad or thickened padding 14a"(1) which experience minimum bending or flexing. The center flexing portion 14b" off the weir may be configured with thin locations or elastomeric material 14b"(1) which require the most bending or flexing during mechanical cycling. The thin locations or elastomeric material 14b"(1) may also be configured at least partially around the center flexing portion 14b". Moreover, the center flexing portion 14b" off the weir may be configured with thickened locations 14b"(2) in areas of low flexure for increased membrane pressure strength. The thickened locations 14b"(2) may be configured at least partially around the center flexing portion 14b". The thin locations or elastomeric material 14b"(1) and the thickened locations 14b"(2) may also be configured so as to alternate, consistent with that shown in FIG. 4.

Furthermore, a thickened area labeled 14a"(2) is configured as a thick portion of the weir seal pad 14a"(1) that requires increased sealing pressure between metal components when the weir-type diaphragm valve is closed. In FIG. 4, a shell seal portion or area labeled 14c" is configured beyond the thickened areas 14a"(2), as shown.

In FIG. 4, the diaphragm 14" is also shown having an attachment stud 32" arranged therein.

The embodiment shown in FIG. 4 are provided by way of example, and other embodiments or configurations having varying thicknesses of the diaphragm 14" are envisioned that are consistent with the spirit of the present invention, but might otherwise appear visually different than that specifically shown in FIG. 4. For example, FIG. 4 shows an embodiment having three thin locations 14b"(1) and two thick locations 14b"(2) that alternate. However, embodiments are envisioned having two thin locations 14b"(1) and three thick locations 14b"(2) that alternate; or two thin locations 14b"(1) and two thick locations 14b"(2) that alternate; or three thin locations 14b"(1) and three thick locations 14b"(2) that alternate; or two thin locations 14b"(1) and one thick location 14b"(2) inbetween the two thin locations 14b"(1); etc. Embodiments are envisioned having some combination of thick and thin locations 14b"(2), 14b"(1) with or without the thickened sealing area 14c"(1) around the periphery; or having some combination of thick and thin locations 14b"(2), 14b"(1) with or without the thickened padding 14a"(1) on the weir sealing portion 14a". Embodiments are envisioned having the thickened padding 14a"(1) on the weir sealing portion 14a" in combination with the thickened sealing area 14c"(1) around the periphery.

Embodiments are also envisioned within the spirit of the present invention where the location with respect to the weir seal pad 14a"(1) may be thinner in order to obtain an optimal seal. The main concept of the present invention is to have local modifications consistent with that disclosed herein to optimize sealing and reduce material stress.

Reduce Weir Bead Height or Eliminate Weir Bead in Areas of Greatest Membrane Inflection According to some embodiments of the present invention, the diaphragm 14, 14', 14" may be configured without a weir bead in areas of greatest membrane inflection, consistent with that shown in relation to FIGS. 2a, 2b, 3a, 3b, and 4.

Alternative, according to some embodiments of the present invention, the diaphragm 14, 14', 14" may be configured with a substantially reduced weir bead height in areas of greatest membrane inflection. In other words, the substantially reduced weir bead may also be configured on, or in relation to, the diaphragm 14, 14', 14" shown in FIGS. 2a, 2b, 3a, 3b, and 4.

Different Material Stresses

According to some embodiments of the present invention, and consistent with that shown in FIGS. 2a, 2b, 3a, 3b, and 4, the different characteristics may be based at least partly on different material stresses associate with deformations of the two or more diaphragm portions 14a, 14b, 14c ; 14a, 14b', 14c'; 14a", 14b", 14c". For example, the diaphragm weir sealing portion 14a, 14a, 14a" may have a first physical characteristic based at least partly on one type of diaphragm surface stress at the weir related to the pushing and pulling of the weir sealing portion to and from the weir in order to close and open the weir-type diaphragm valve, and the center flexing portion 14b, 14b', 14b" may have a second physical characteristic based at least partly on another type of diaphragm surface stress off the weir related to mechanical cycling of the center flexing portion when opening and closing the weir-type diaphragm valve.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

Finally, the scope of the invention is intended to include embodiments, where a characteristic of one diaphragm portion could be based on a prior art characteristic of the one diaphragm portion, while the other characteristic of the other diaphragm portion could be based on one of the new techniques set forth in the instant patent application. In other words, the scope of the invention is not intended to require that embodiments contain two of the techniques disclosed in the instant patent application be used together. Instead, only the characteristics of the two different diaphragm portions themselves need to be different.

What I claim is:

1. A weir-type diaphragm valve, comprising:
    a valve body configured with a fluid channel and a weir having a weir sealing portion; and
    a diaphragm configured with two or more diaphragm portions, including
        a diaphragm weir sealing portion at the weir to respond to one force and travel against the weir sealing portion to close the weir-type diaphragm valve and stop fluid flow through the fluid channel, and respond to a second force and travel away from the weir sealing portion to open the weir-type diaphragm valve and allow fluid flow through the fluid channel, the diaphragm weir sealing portion having a pair of studs embedded therein perpendicular to the orientation of the weir to initiate inflection with lower stress and to be on a respective side of the weir when the weir-type diaphragm valve is closed so as to stop the fluid flow through the fluid channel,
        a center flexing portion off the weir configured to experience convex and concave flexing extremes when the weir-type diaphragm valve is closed and opened, and
        an outer sealing portion configured to be fully constrained between components, one of which includes the valve body, when the weir-type diaphragm valve is closed and opened;
    the two or more diaphragm portions being configured with different characteristics based at least partly on different material stresses associated with different functionality that each portion is configured to perform when the weir-type diaphragm valve is closed and opened, including where the diaphragm weir sealing portion has a first physical characteristic based upon the inflection with lower stress on each respective side of the weir related to the pair of studs pushing and pulling the weir sealing portion to and from the weir in order to close and open the weir-type diaphragm valve, and including where the center flexing portion has a second physical characteristic based upon the convex and concave flexing extremes off the weir related to mechanical cycling of the center flexing portion when opening and closing the weir-type diaphragm valve.

2. A weir-type diaphragm valve according to claim 1, wherein the diaphragm is configured with a substantially reduced weir bead height in areas of greatest membrane inflection.

3. A weir-type diaphragm valve according to claim 1, wherein the different characteristics are based at least partly on different material stresses associate with deformations of the two or more diaphragm portions.

4. A weir-type diaphragm valve according to claim 1, wherein the diaphragm weir sealing portion at the weir has a shape based upon a deviation from a rotational symmetry, and the different characteristics are based at least partly on the shape of the diaphragm weir sealing portion at the weir.

5. A weir-type diaphragm valve according to claim 4, wherein the weir sealing portion has a corresponding shape, and the shape of the diaphragm weir sealing portion at the weir is configured to match the corresponding shape of the weir sealing portion.

6. A weir-type diaphragm valve according to claim 5, wherein the center flexing portion off the weir is shaped to reduce stress with inflection.

7. A weir-type diaphragm valve according to claim 6, wherein the center flexing portion is shaped on either side of the weir to reduce resistance to diaphragm inversion.

8. A weir-type diaphragm valve according to claim 4, wherein the remaining diaphragm portion has an associated shape on either side of the weir to reduce resistance to diaphragm inversion.

9. A weir-type diaphragm valve according to claim 1, wherein the different characteristics are based at least partly on forming a diaphragm "free" shape between open and closed requirements of the weir-type diaphragm.

10. A weir-type diaphragm valve according to claim 9, wherein the diaphragm "free" shape includes balancing tensile and compressive material stress extremes during mechanical cycling, and can facilitate easier diaphragm installation with a midway compressor position, 11. A weir-type diaphragm valve according to claim 1, wherein the different characteristics are based at least partly on a difference in the thickness of the two or more diaphragm portions.

12. A weir-type diaphragm valve according to claim 11, wherein the diaphragm weir sealing portion at the weir is configured with thickened padding to achieve the required function of geometrical compliance between a compressor and the valve body.

13. A weir-type diaphragm valve according to claim 11, wherein the center flexing portion off the weir is configured with thin locations or elastomeric material which require the most bending or flexing during mechanical cycling.

14. A weir-type diaphragm valve according to claim 13, wherein the thin locations or elastomeric material is configured at least partially around the center flexing portion.

15. A weir-type diaphragm valve according to claim 11, wherein the center flexing portion off the weir is configured with thickened locations in areas of low flexure for increased membrane pressure strength.

16. A weir-type diaphragm valve according to claim 13, wherein the thickened locations are configured at least partially around the center flexing portion.

17. A weir-type diaphragm valve according to claim 11, wherein the center flexing portion off the weir is configured with:
   thin locations or elastomeric material which require the most bending or flexing during mechanical cycling, the thin locations or elastomeric material being configured at least partially around the center flexing portion; and
   thickened locations in areas of low flexure for increased membrane pressure strength, the thickened locations are configured at feast partially around the center flexing portion.

18. A weir-type diaphragm valve according to claim 17, wherein the thin locations or elastomeric material and the thickened locations are alternated on the center flexing portion.

19. A weir-type diaphragm valve according to claim 11, wherein the diaphragm weir sealing portion, the center flexing portion and the outer sealing portion have respective thicknesses, and the outer sealing portion is configured with thickened areas compared to the diaphragm weir sealing portion and the center flexing portion, which require increased sealing pressure between metal components when the weir-type diaphragm valve is closed.

20. A weir-type diaphragm valve according to claim 1, wherein the weir-type diaphragm valve comprises a backing cushion as a compliant spring membrane between a metal compressor and the diaphragm.

21. A weir-type diaphragm valve according to claim 20, wherein the backing cushion comprises two or more backing cushion portions configured with different characteristics based at least partly on different material stresses associated with different functionality that each portion is configured to perform when the weir-type diaphragm valve is closed and opened.

* * * * *